United States Patent
Ouimette

(10) Patent No.: US 9,456,083 B1
(45) Date of Patent: Sep. 27, 2016

(54) CONFIGURING CONTACT CENTER COMPONENTS FOR REAL TIME SPEECH ANALYTICS

(71) Applicant: Noble Systems Corporation, Atlanta, GA (US)

(72) Inventor: Jason P. Ouimette, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 339 days.

(21) Appl. No.: 14/073,083

(22) Filed: Nov. 6, 2013

(51) Int. Cl.
H04M 3/00 (2006.01)
H04M 5/00 (2006.01)
H04M 3/51 (2006.01)

(52) U.S. Cl.
CPC .......... *H04M 3/5175* (2013.01); *H04M 3/5158* (2013.01)

(58) Field of Classification Search
CPC ........... H04M 3/5175; H04M 3/5158; H04M 2203/402
USPC .......................... 379/265.02, 265.07, 266.07
See application file for complete search history.

(56) References Cited

U.S. PATENT DOCUMENTS

| | | | |
|---|---|---|---|
| 5,267,305 A | 11/1993 | Prohs et al. | |
| 6,356,634 B1 | 3/2002 | Noble, Jr. | |
| 6,862,343 B1 | 3/2005 | Vacek et al. | |
| 7,133,828 B2 | 11/2006 | Scarano et al. | |
| 7,542,902 B2 | 6/2009 | Scahill et al. | |
| 7,548,539 B2 | 6/2009 | Kouretas et al. | |
| 7,574,000 B2 | 8/2009 | Blair | |
| 7,672,845 B2 | 3/2010 | Beranek et al. | |
| 7,752,043 B2 | 7/2010 | Watson | |
| 7,930,179 B1 | 4/2011 | Gorin et al. | |
| 7,974,411 B2 | 7/2011 | Krishnapuram et al. | |
| 8,078,470 B2 | 12/2011 | Levanon | |
| 8,094,790 B2 | 1/2012 | Conway et al. | |
| 8,094,803 B2 | 1/2012 | Danson et al. | |
| 8,155,297 B1 | 4/2012 | Dhir et al. | |
| 8,175,007 B2 | 5/2012 | Jain et al. | |
| 8,180,643 B1 | 5/2012 | Pettay et al. | |
| 8,204,180 B1 | 6/2012 | Narayanan et al. | |
| 8,209,182 B2 | 6/2012 | Narayanan | |
| 8,219,401 B1 | 7/2012 | Pettay et al. | |
| 8,249,875 B2 | 8/2012 | Levanon et al. | |
| 8,275,115 B1 | 9/2012 | Everingham et al. | |

(Continued)

OTHER PUBLICATIONS

Office Action Received for U.S. Appl. No. 14/230,463 dated Jan. 14, 2016.

(Continued)

*Primary Examiner* — Nafiz E Hoque

(57) ABSTRACT

Configuration parameters are defined for indicating when and how a call handled by a call handler is to be streamed to a speech analytics system ("SAS"). The parameters may indicate when a call is to be streamed by identifying certain campaigns or agents in which calls associated therewith are to be streamed to the SAS. The parameters may also identify how the streaming is to occur, namely via a single audio stream, a mixed audio stream, or dual audio streams. When using dual audio streams, a stream for the agent audio is established separately from a stream for the remote party audio. In addition, procedures are indicated for determining whether a license is available for interfacing with the SAS. The number of licenses used for a call depends on whether the configuration parameters indicate one or two streams are to be established.

16 Claims, 7 Drawing Sheets

(56) References Cited

U.S. PATENT DOCUMENTS

| | | |
|---|---|---|
| 8,396,205 B1 | 3/2013 | Lowry et al. |
| 8,396,732 B1 | 3/2013 | Nies et al. |
| 8,401,155 B1 | 3/2013 | Barnes et al. |
| 8,422,641 B2 | 4/2013 | Martin, II |
| 8,463,606 B2 | 6/2013 | Scott et al. |
| 8,504,371 B1 | 8/2013 | Vacek et al. |
| 8,531,501 B2 | 9/2013 | Portman et al. |
| 8,761,376 B2 | 6/2014 | Pande et al. |
| 8,767,948 B1 | 7/2014 | Riahi et al. |
| 8,781,092 B2 | 7/2014 | Noble, Jr. |
| 8,949,128 B2 | 2/2015 | Meyer et al. |
| 9,014,364 B1 | 4/2015 | Koster et al. |
| 2003/0002651 A1 | 1/2003 | Shires |
| 2003/0154120 A1 | 8/2003 | Freishtat et al. |
| 2004/0008828 A1 | 1/2004 | Coles et al. |
| 2004/0249650 A1 | 12/2004 | Freedman et al. |
| 2005/0238161 A1 | 10/2005 | Yacoub et al. |
| 2005/0286705 A1 | 12/2005 | Contolini et al. |
| 2005/0286706 A1* | 12/2005 | Fuller ............... H04M 3/5166 379/265.02 |
| 2006/0050658 A1 | 3/2006 | Shaffer et al. |
| 2006/0259473 A1 | 11/2006 | Li et al. |
| 2006/0262919 A1 | 11/2006 | Danson et al. |
| 2006/0265090 A1* | 11/2006 | Conway ............ H04M 3/5175 700/94 |
| 2007/0160054 A1 | 7/2007 | Shaffer et al. |
| 2007/0280211 A1 | 12/2007 | Malueg et al. |
| 2007/0280460 A1 | 12/2007 | Harris et al. |
| 2008/0002823 A1 | 1/2008 | Fama et al. |
| 2008/0027785 A1 | 1/2008 | Mechaley et al. |
| 2008/0037719 A1 | 2/2008 | Doren |
| 2008/0082330 A1 | 4/2008 | Blair |
| 2008/0240376 A1 | 10/2008 | Conway et al. |
| 2008/0270123 A1 | 10/2008 | Levanon et al. |
| 2009/0157449 A1 | 6/2009 | Itani et al. |
| 2009/0295536 A1 | 12/2009 | Doren |
| 2010/0036670 A1 | 2/2010 | Hill et al. |
| 2010/0082342 A1 | 4/2010 | Erhart et al. |
| 2010/0104086 A1 | 4/2010 | Park |
| 2010/0138411 A1 | 6/2010 | Judy et al. |
| 2010/0158237 A1 | 6/2010 | McCormack et al. |
| 2010/0161990 A1 | 6/2010 | Statham et al. |
| 2011/0010173 A1 | 1/2011 | Scott et al. |
| 2011/0026688 A1 | 2/2011 | Simpson |
| 2011/0033036 A1 | 2/2011 | Edwards et al. |
| 2011/0125499 A1 | 5/2011 | Griggs et al. |
| 2011/0145093 A1 | 6/2011 | Paradise et al. |
| 2011/0202344 A1 | 8/2011 | Meyer et al. |
| 2011/0218798 A1 | 9/2011 | Gavalda |
| 2011/0228919 A1 | 9/2011 | Tew et al. |
| 2011/0307258 A1 | 12/2011 | Liberman et al. |
| 2011/0317828 A1 | 12/2011 | Corfield |
| 2012/0045043 A1 | 2/2012 | Timpson |
| 2012/0140911 A1 | 6/2012 | Johansen et al. |
| 2012/0263285 A1 | 10/2012 | Rajakumar et al. |
| 2013/0003943 A1 | 1/2013 | Munns et al. |
| 2013/0129069 A1 | 5/2013 | Peterson |
| 2013/0246053 A1 | 9/2013 | Scott et al. |
| 2014/0100848 A1 | 4/2014 | Shaffer et al. |
| 2014/0140496 A1 | 5/2014 | Ripa et al. |
| 2014/0140497 A1 | 5/2014 | Ripa et al. |
| 2014/0163960 A1 | 6/2014 | Dimitriadis et al. |
| 2014/0241519 A1 | 8/2014 | Watson et al. |
| 2014/0257820 A1 | 9/2014 | Laperdon et al. |
| 2014/0379525 A1 | 12/2014 | Timem et al. |
| 2015/0106091 A1 | 4/2015 | Wetjen et al. |
| 2015/0281446 A1 | 10/2015 | Milstein et al. |

OTHER PUBLICATIONS

Office Action Received for U.S. Appl. No. 13/968,692 dated Jun. 11, 2015.

Office Action Received for U.S. Appl. No. 14/230,463 dated Jun. 19, 2015.

Notice of Allowance Received for U.S. Appl. No. 13/949,467 dated Jul. 17, 2015.

Notice of Allowance Received for U.S. Appl. No. 14/186,404 dated Sep. 1, 2015.

Office Action Received for U.S. Appl. No. 14/230,463 dated Oct. 1, 2015.

Office Action Received for U.S. Appl. No. 14/661,676 dated Sep. 21, 2015.

Office Action Received for U.S. Appl. No. 14/445,501 dated Nov. 24, 2015.

Office Action Received for U.S. Appl. No. 13/968,692 dated Nov. 30, 2015.

Office Action Received for U.S. Appl. No. 14/875,130 dated Dec. 1, 2015.

Notice of Allowance Received for U.S. Appl. No. 14/661,676 dated Nov. 20, 2015.

Office Action Received for U.S. Appl. No. 14/172,993 dated Dec. 18, 2015.

Asterisk DTMF, Voip=Info.o—A Reference Guide to All Things VoIP, four pages, retrieved on Mar. 18, 2013 from www.voip-info.org/wiki/view/Asterosk+DTMF.

Notice of Allowance received for U.S. Appl. No. 13/861,102, mailed May 2, 2014.

Office Action Received for U.S. Appl. No. 14/186,404 dated Dec. 12, 2014.

Office Action Received for U.S. Appl. No. 14/230,328 dated Nov. 28, 2014.

Schulzrinne, H; Petrack, S; Request for Comments 2833 ("RFC 2833"), RTP Payload for DTMF Digits, Telephony Tone, and Telephony Signals May 2000, 29 pages, The Internet Society, U.S.

Donovan, S; Request for Comments 2976 ("RFC 2976"), The SIP Info Method; The Internet Society, Oct. 2000, 9 pages, U.S.

Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.

Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.

Homberg, C; Burger, E; Kaplan, H.; Request for Comments 6086 ("RFC 6086"), Session Initiation Protocol (SIP) Info Method and Package Framework, Internet Engineering Task Force, Jan. 2011, 36 pages, U.S.

Kuthan, Jiri; Sisalem, Dorgham; SIP: More Than You Ever Wanted to Know About; Powerpoint Presentation, Mar. 2007, 242 pages, Tekelec, U.S.

Three Steps for Attacking Adherence Problems, Reynolds, Penny, Contact Center Association, Jan. 24, 2012.

U.S. Appl. No. 61/753,641, filed Jan. 17, 2013.

Office Action Received for U.S. Appl. No. 13/949,467 dated Feb. 6, 2015.

Notice of Allowance Received for U.S. Appl. No. 14/230,328 dated Feb. 6, 2015.

Office Action Receivied for U.S. Appl. No. 14/186,404 dated May 8, 2015.

Office Action Received for U.S. Appl. No. 14/080,912 dated Apr. 8, 2016.

Office Action Received for U.S. Appl. No. 14/743,200 dated Apr. 7, 2016.

Notice of Allowance Received for U.S. Appl. No. 14/445,501 dated Feb. 4, 2016.

Notice of Allowance Received for U.S. Appl. No. 14/875,130 dated Feb. 24, 2016.

Office Action Received for U.S. Appl. No. 14/230,463 dated Mar. 30, 2016.

* cited by examiner

US 9,456,083 B1

CONFIGURING CONTACT CENTER COMPONENTS FOR REAL TIME SPEECH ANALYTICS

CROSS REFERENCE TO RELATED APPLICATIONS

This application incorporates by reference the contents of U.S. patent application Ser. No. 13/949,467, now U.S. Pat. No. 9,225,833, entitled Management System for Using Speech Analytics To Enhance Contact Center Agent Conformance filed on Jul. 24, 2013, and U.S. patent application Ser. No. 13/968,692 entitled Functions and Associated Communication Capabilities for a Speech Analytics Component to Support Agent Compliance in a Call Center filed on Aug. 16, 2013.

BACKGROUND

Speech analytics has matured to the point that the technology can be frequently and reliably used to increase productivity and efficiency for various contact center applications. Specifically, speech analytics can not only recognize a keyword, but determine the context of a verbal exchange between an agent and a remote party. Speech analytics can operate in real time as well to provide useful tools for agents and supervisors. Automated processes can be designed for detecting when certain conditions warrant escalation, assisting the agent with information to service a call, and identifying agents who may benefit from training.

Speech analytics systems can operate in various modes depending on the application of the speech analytics system. That is, what the speech analytics system is supposed to do may impact how the speech analytics system is configured, as well as how the corresponding contact center components are configured. For example, a speech analytics system may be used to analyze the speech of the remote party in an attempt to identify a purpose of the call. In another instance, the speech analytics system may be used to analyze the speech of the agent to determine if the agent requires additional training to provide adequate service. Other applications may analyze the speech of both the agent and the remote party. In each of these various configurations, the contact center may be configured differently and these configurations should allow optimization of the operation of the components, while providing flexibility. Thus, appropriate configuration procedures are necessary to ensure efficient and effective configuration of call center components with a speech analytic system.

SUMMARY

In general, embodiments of the present invention provide computer-program products, methods, systems, apparatus, and computing entities for configuring interfaces between a call handler and a speech analytic system. Aspects of configuring the interface include determining whether a single audio stream or multiple audio streams are established. A single audio stream may be established that includes speech of both the agent and the remote party, while multiple audio streams may be established, where each stream conveys the speech of only one party on the call, namely either the agent or the remote party. The determination of whether single or multiple streams are to be established may be based, in part, on the campaign that the call is associated with.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1A:
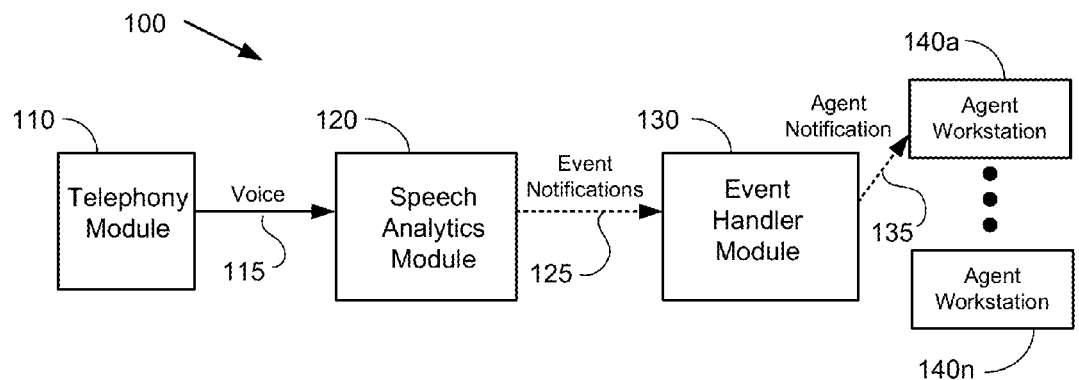
FIGS. 1A and 1B illustrate embodiments of an architecture in a contact center for processing speech.
Figure 1B:
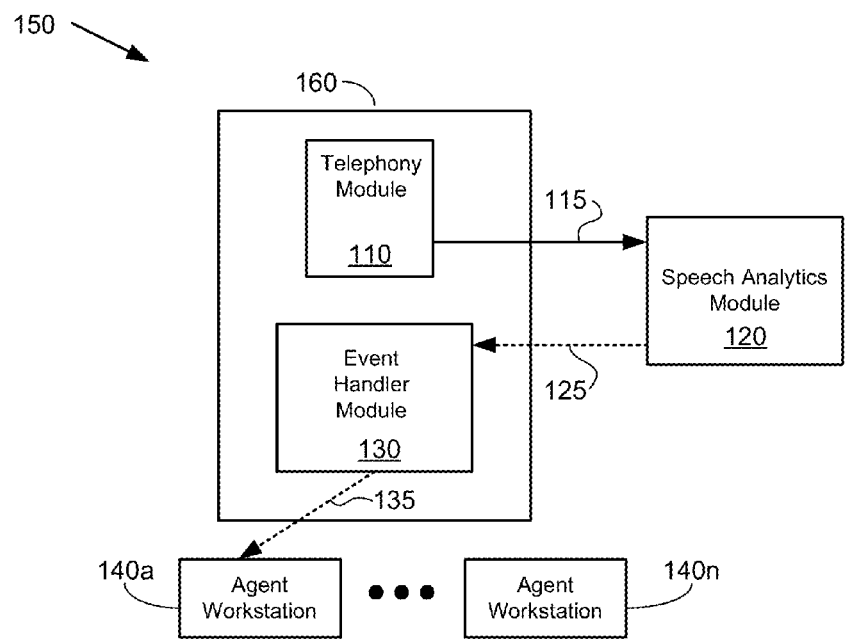

An architecture for using of a speech analytics system ("SAS") in a contact center environment may be deployed as shown in FIGS. 1A-1B. Turning first to FIG. 1A, one architecture 100 is based on telephony module 110 performing various telephony related functions. The telephony module 110 could be based on a variety of technologies, such as a conventional telephone switch switching time-division multiplex ("TDM") channels, a private branch exchange ("PBX"), or a packetized switching element or router that is able to route voice data in the form of VoIP packets.

The telephony module 110 may route a voice call 115, or conference a call leg to a call, over a corresponding facility to a speech analytics module ("SAM") 120. The facility may use wireline, coaxial conductor, optical fiber, radio transmission, or any other suitable technology that allows voice traffic to be provided from the telephony module 110 to the SAM 120. Although the parties on the call are not shown, the call may involve an agent in a contact center and a remote party. From the perspective of the contact center, the call with the remote party may involve an incoming or outgoing call. The SAM 120 may reside in a speech analytics system in the contact center, or external to the contact center. Further, the SAM may be integrated with other contact center components, as shall be seen. The SAM 120 receives speech associated with the call 115 and analyzes the speech of the call according to a pre-determined framework of topics or key phrases that are to be detected. For example, in one embodiment, the SAM may analyze the agent's speech to ascertain if a proper standard greeting was used, whether an attempt was made by the agent to up-sell the remote party for a service, whether the agent uttered profanity, etc.

The SAM 120 only needs to monitor audio information of the call between the agent the remote party, and therefore a single one-way audio connection conveying speech of the agent and the remote party could be used to receive the audio from the telephony module. Specifically, the SAM in many embodiments does not interject any audio back into the call between the agent and the remote party. In some embodiments, a return audio path back from the SAM could be established to the telephony module, but since the SAM would not be streaming any audio to the telephony module, the end result is the same as if only a unidirectional data flow occurs.

For purposes of this disclosure, reference to "streaming a call" refers to streaming audio data of the call. Further, streaming calls associated with an agent or campaign likewise means streaming audio data of calls associated with the agent or campaign. Furthermore, "streaming audio" of a call is the same as streaming audio data of the call. Depending on the context, the audio of the call may comprise audio from one party only or both parties.

In one embodiment, analyzing the speech involves the SAM comparing the speech against a defined set of keywords. For example, if the agent's speech is monitored for the presence of profanity, then the keyword set may include a list of curse words. If the remote party's speech is monitored for use of a particular response, then those words may also be included in the keyword set. This keyword set may also sometimes be referred to as a "topic."

If the SAM 120 detects one of the keywords in one or more keyword sets in the audio of the call, it sends an event notification 125 to an event handler module 130 each time a keyword is detected. Thus, the SAM 120 may be said to "throw off" or generate a number of event notifications during a call. In one embodiment, the event handler module 130 includes logic for processing the event notification as appropriate for the given context. For example, if a curse word is detected by the SAM 120 during a call, it will provide an event notification 125 to the event handler module 130. As will be seen, this event may report which party uttered the curse word, or the event may merely report it was detected on the call.

In another example, assume that the contact center is handling calls for multiple clients. Thus, incoming calls may be categorized as being associated with one of two campaigns. One campaign may be associated with ABC corporation and the other with XYZ corporation. Agents are instructed to greet each incoming caller as appropriate. This can be readily distinguished based on the number the caller dialed. The SAM may be programmed to detect which greeting was used and report if the agent uses an inappropriate greeting. However, merely knowing that a given agent said "Thank you for calling ABC corporation" in response to an incoming call does not provide sufficient information. This greeting may or may not be an appropriate greeting, depending the context. Thus, the SAM may be configured to recognize which greeting is used and report it to the event handler module, but the event handler module 130 determines whether this greeting is in conformance with the agent's duties based on the campaign. In other words, the event handler module has the processing logic to determine whether the recognized greeting was appropriate or not.

In many instances, the event handler module will receive many event notifications from the SAM and simply ignore the notifications. For example, if a remote party is reported as uttering a profanity, this event notification may be ignored. However, if the agent is reported as uttering a profanity, then this event notification will likely be acted upon. In some instances, the event notification may correspond to normal (expected) operation and no further action is required. It is possible such normal events may be recorded as having occurred. Usually, the abnormal events will be recorded, and in some cases, an agent notification 135 may be sent to the agent's workstation 140a, and/or to a supervisor's workstation. In many embodiments, there will be a plurality of agent workstations 140a-140n which may receive agent notifications for their respective call. In various embodiments, the workstation may, in turn, present a visual indication to the agent of the condition, or provide some other form of assistance to the agent.

FIG. 1B shows another embodiment where certain components may be co-located with each other. It should be appreciated that other variations are possible. In FIG. 1B, this architecture 150 is based on a call handler 160 comprising a computing system that incorporated both the telephony module 110 and the event handler module 130. As in FIG. 1A, the telephony module 110 provides the call 115 to the SAM 120, and the SAM 120 provides various event notifications 125 to the event handler module 130 upon detecting keywords. Further, the event handler module may provide agent notifications 135 to various agent workstations 140a-140n.

Figure 2A:
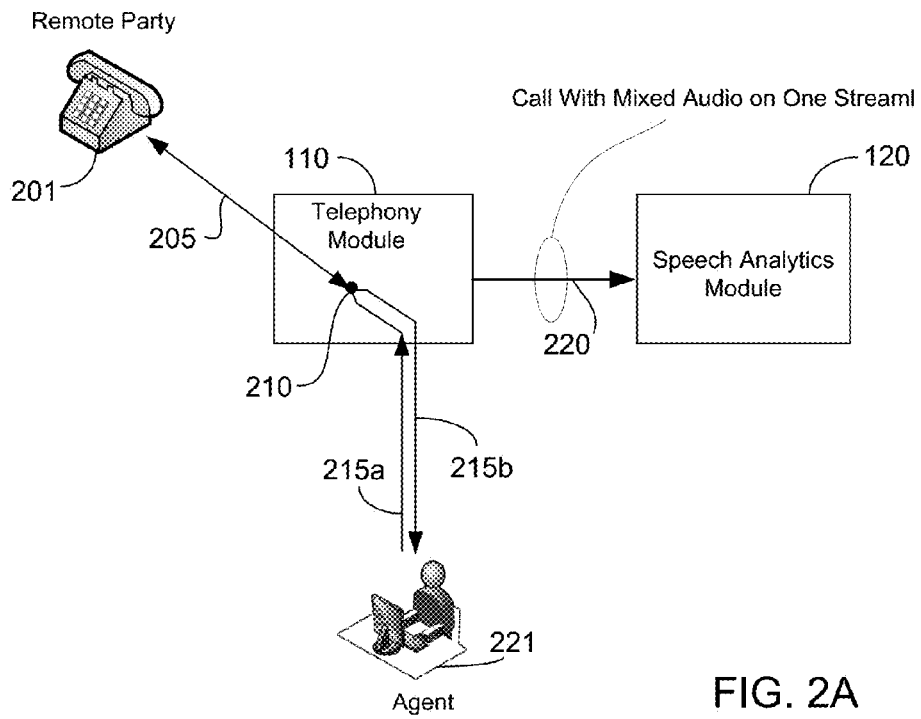
FIGS. 2A and 2B illustrate embodiments of streaming voice to a speech analytics module in a contact center.

Focusing on the interface between the telephony module 110 and the SAM 120, FIG. 2A provides additional details regarding the potential interface configurations that may be used. First, a remote party is shown as represented by a conventional telephone 201. In this embodiment, the telephone is connected via a conventional telephone facility 205 which may involve various telecommunication networks, interfaces, gateways, and facilities to reach the telephony module 110. Further, the telephony module is presumed to utilized a VoIP interface to the agent's workstation 221. The VoIP interface to the agent's workstation is shown as two distinct streams 215a and 215b for conveying voice to and from the agent. This may be conveyed by a LAN or other suitable networking technology. A gateway function 210 is shown and is used to interwork the VoIP traffic 215a, 215b with the plain-old-telephone ("POTS") traffic 205. In other embodiments, the gateway function 210 may be located external to the telephony module 110, or even externally to the contact center.

In this embodiment, the voice call to the SAM 120 may be provided using VoIP technology, wherein the voice is packetized according to any of the well known standards. Various standards, such as SIP, may be used to establish such calls, and other protocols, such as RTP and/or RTPS, may be used to stream or control the streams. In various embodiments, the audio stream to the SAM may include audio from both the remote party and the agent, or just audio from one or the other. Specifically, audio from both parties may be mixed together in the telephony module (or some other module) and then provided on a single VoIP stream to the SAM.

Integrating audio from both the agent and remote party into a single VoIP stream 220 facilitates the SAM detecting keywords spoken by either the agent or the remote party. However, in some embodiments, the SAM may not be able to adequately distinguish which individual spoke a given keyword in the audio of the call. That is, without knowing a priori which voice is the agent and which voice is the remote party, the SAM may be able to detect a keyword, but not indicate which individual spoke the keyword. Clearly, in many embodiments it is useful to know which party uttered a keyword. For example, returning to the example of detecting profanity, detecting the presence of profanity during a call has some utility, but knowing whether the agent or the remote party uttered the profanity is necessary in order to determine whether the agent is complying with policies.

Figure 2B:
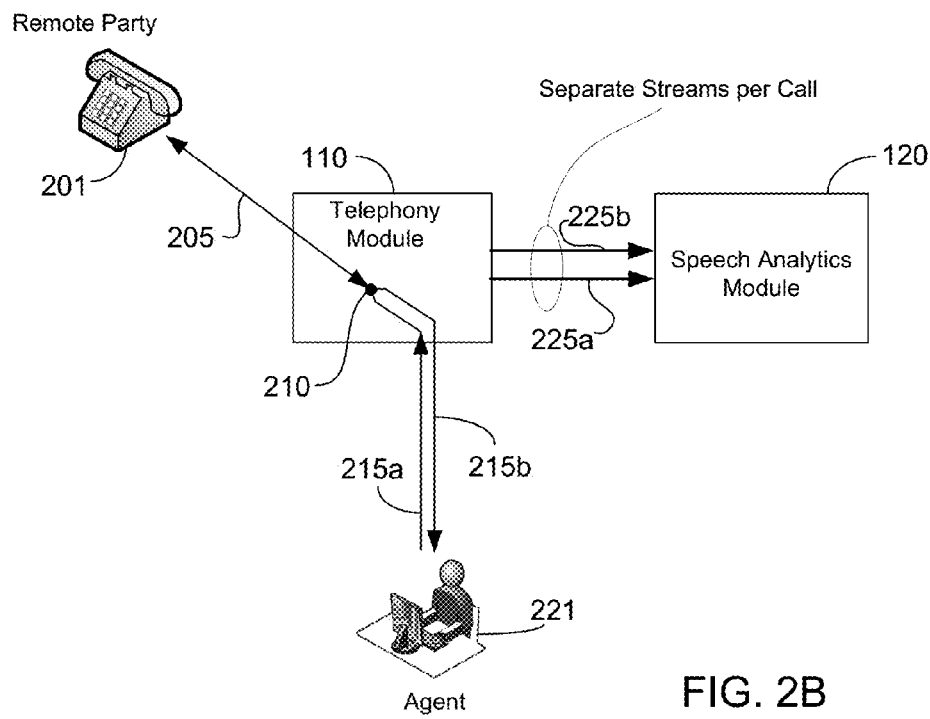

To address this situation, the architecture show in FIG. 2B may be used. Again, this architecture is based on using a VoIP based protocol between the telephony module 110 and the SAM 120. In this embodiment, the telephony module does not integrate or mix the audio from the agent and the remote party together onto one VoIP stream. Rather, two separate VoIP streams 225a, 225b are used to convey audio from the parties of the call. One stream (also sometimes referred to as a channel) represents audio from the agent and the other stream represents audio from the remote party. Again, RTP may be the protocol used to stream the audio, although a variety of other protocols may be involved. The SAM typically knows which individual a given stream is associated with when the stream for that call is established. Thus, the SAM knows that, for example, VoIP on one stream 225a is audio from the agent, while the other stream 225b is audio of the remote party.

Using an arrangement of dual audio streams facilitates the SAM recognizing speech that is attributable to either the agent or the party. Thus, returning to the previous example, it is clear that if a profanity is uttered and detected in a stream, then it can be readily determined which individual uttered the words.

Depending on the application, use of a single or dual stream may be appropriate. For example, one application of using a SAM may be to determine a context of the call. Inbound calls may be made to a financial institution involving a credit card. The caller may be calling to perform one of several functions, such as: ascertain a current balance on a particular credit card, check on a payment, report a lost card, activate a card, apply for a card, or update address information associated with a card. In many instances, the call may be classified into one of these main categories based on detecting a keyword from the remote party. This could be a keyword ascertained based on speech from either the caller or the agent. Thus, in this instance, monitoring speech on a mixed audio stream may be appropriate to determine the purpose of the call. If two separate streams are monitored, then procedures may have to be defined to correlate the analysis of the two streams to ascertain the context. Specifically, when there are a number of calls, correlating which of the two streams are associated with the same call becomes necessary.

If, however, the application of the speech analytics is to determine whether particular individuals (e.g., agent or caller) have spoken a particular keyword, then using separate voice streams facilitates the analysis. In this case, knowing which audio stream a keyword was detected in provides sufficient information to identify which party was involved. Doing so may involve using twice as many processing ports, licenses, or other resources with respect to the SAM and establishing twice as many audio streams from the telephony module.

It is quite possible in some implementations that the call handler in the contact center processes calls for multiple campaigns and that each of the campaigns has different requirements relative to speech analytics processing. Specifically, some campaigns may not require speech analytics processing at all. Other calls may process both the agent and the caller's speech so that a mixed stream of audio to the SAM is sufficient. However, other campaigns may require separate audio streams per call to perform the desired speech analytics. Thus, the call handler should be configurable to provide any of the above configurations: no streams to the SAM, a mixed audio stream per call to the SAM, and separate streams per call to the SAM.

The determination of whether any streams, and how many, are to be allocated for each call can be defined in various ways. One approach is to define this on a campaign level. Campaigns can variously define what category a call is considered to be in, and this can be done in various ways for different types of calls. For example, inbound campaigns can be identified as calls directed to a particular telephone number or when the caller indicates a particular menu selection in an IVR. Other techniques can be used, including using speech analytics. Outbound campaigns can be defined, in part, based on the list used when originating calls. Distinguishing on a per-campaign level for inbound or outbound calls can be avoided if speech analytics is to occur in the same manner for "all campaigns." Thus, in various embodiments, all campaigns could be treated the same with respect to whether calls are streamed to the SAM, all inbound or outbound campaigns could be treated the same, or each campaign could be treated in a unique manner.

Another approach for defining whether to configure the audio streams to the SAM is on a per-agent basis. Thus, each agent will be associated with interface configuration parameters defining whether streaming should occur. In one special case, a setting for "all agents" may be defined to facilitate setting each and every agent for streaming the audio to the SAM.

Once streaming is determined as required, another parameter may define how the streaming is to occur. For example, streaming may be defined as mixed audio on one channel or separate channels for the agent and remote party. Thus, parameters may be defined on an agent basis or a campaign basis indicating whether and how streaming should occur.

There are other approaches for defining the streaming interface configuration. A group identifier may define a particular campaign as being associated with a group of agents. The group identifier may be used to define the streaming interface configuration. Certain calls in a campaign may be treated differently with respect to speech analytics. For example, calls from "platinum member" card holders in a given campaign may be treated differently than calls from "gold" or "silver" members in the same campaign. Different speech analytics processing may be applied, and hence different streaming interface configurations may be used, even though all the calls involve the same campaign. Those skilled in the art of call centers will be able to define other approaches for defining how the streaming interface configuration should be determined in light of the concepts and technologies disclosed herein.

Another approach for determining whether to stream a call involves consideration of whether the call is to be recorded. There may be various reasons that link the use of speech analytics of a call with recording the call. A recording can be used to verify the accuracy or conclusions of the speech analytics processing. For example, speech analytics can be used to rate the performance of the agent. If the rating of the agent is contested by the agent, the agent may desire to review the actual recording. Since the operation of speech analytics is not perfect, such verification may be necessary to further improve the speech analytics platform, alter the program logic in the event handler module to handle unexpected cases, etc. Thus, for various reasons, recording and streaming may be correlated so that all recorded calls are also streamed to the SAM or vice versa.

Figure 3:
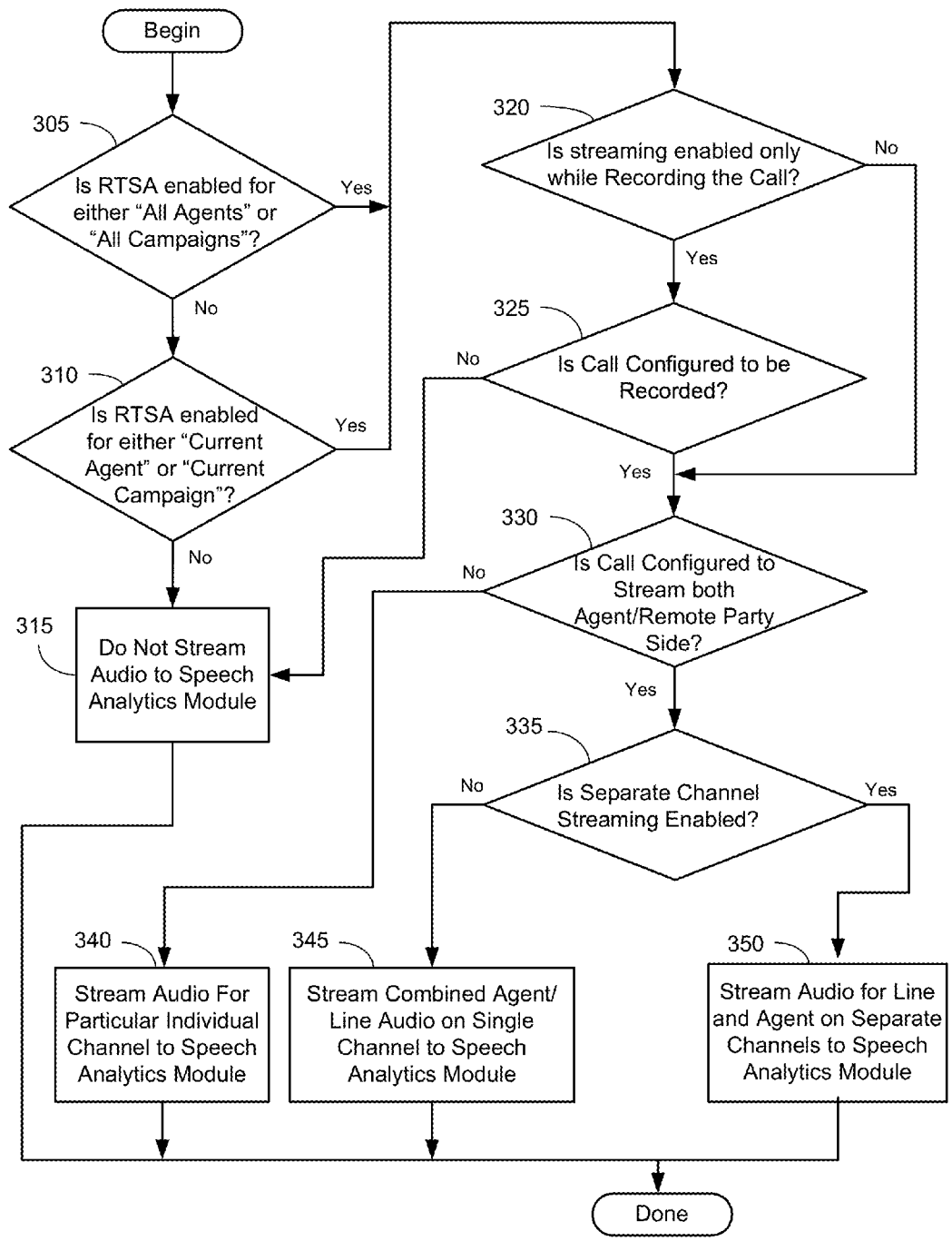
FIG. 3 illustrates one embodiment of a process flow for configuring an interface for streaming audio in a contact center.

One embodiment of a process flow for configuring the audio streams to the SAM is shown in FIG. 3. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Returning to FIG. 3, the process is based on performing real-time speech analytics ("RTSA") using various parameters, including those that pertain to agents, campaigns, recordings, and single/multiple streams. As noted above, other variations may be defined for determining whether and how streaming is to occur for a particular call.

The process begins with determining whether real-time speech analysis ("RTSA") is enabled for "all agents" or for "all campaigns" in operation 305. If RTSA is not enabled in operation 305, then the process continues to operation 310 for a test to determine whether RTSA is enabled for either the current agent or the current campaign. If the answer is "no", (and there is no other basis for streaming the call), then the process proceeds to operation 315 where no stream is established to the SAM and the process is completed.

If the result is "yes" for either operation 305 or operation 310 (indicating a basis for streaming the call), then the process flow continues to operation 320, wherein a test is made to determine whether streaming is enabled only while recording the call. This operation reflects one embodiment where streaming may be correlated with call recording. In other words, if the call is recorded it will be streamed, but if not recorded, then streaming will not occur. This can be viewed as an exception to recording the call that was previously indicated from operations 305 or 310. Other embodiments may treat recording of the call as a separate parameter that is not correlated with performing speech analytics.

If the result of operation 320 is "yes" (namely, streaming is correlated with call recording), then a test occurs in operation 325 as to whether the call should be recorded. If the answer is "no", then the call should not be steamed as well, and the operation continues to operation 315, and the process completes. In essence, the call may be streamed only if it is also recorded.

If the result of operation 320 is "no" or the result of operation 325 is "yes", then that means the call should be streamed. At this point, there are three potential ways in which the call may be streamed:

stream only audio from one party (either the agent or remote party), stream audio from both parties mixed onto one audio stream, stream audio from both parties on separate audio streams.

These possibilities are reflected by first determining in operation 330 whether both the agent and remote party are to be streamed. If the answer is "no", then the process continues to operation 340 where only one party, the particular party indicated in the configuration parameters, is streamed. If both the agent and remote party are to be streamed in operation 330, then another test in operation 335 determines whether the configuration parameters define streaming to occur using separate channels or a single channel. If separate channels are not be used in operation 335, then the process continues in operation 345 where combined agent and remote party audio is mixed into a single stream and sent to the SAM. If separate channels are to be used as determined in operation 335, then the process continues to operation 350 where separate streams are used to stream the agent's audio and the remote party's audio. The process for determining whether and how to stream the audio is then completed.

This embodiment allows calls associated with particular agents or campaigns to be streamed, and further allows recording of the call to be an exception when streaming otherwise would occur. Further, streaming may occur using only one audio stream, which may convey audio from one party or both parties. In another embodiment, if streaming of both parties is to occur, then multiple streams may be used. This allows a wide variety of interface configurations for interfacing with the SAM.

The above process flow can occur in the call handler prior to, or contemporaneous with, handling a call. That is, the call handler may be configured by the administrator prior to interfacing with the SAM indicating how calls are to be streamed. The administrator may configure the interfaces using a graphical user interface ("GUI") which presents the appropriate options and collects the desired configuration parameters. One such GUI is shown in FIG. 4.

Figure 4:
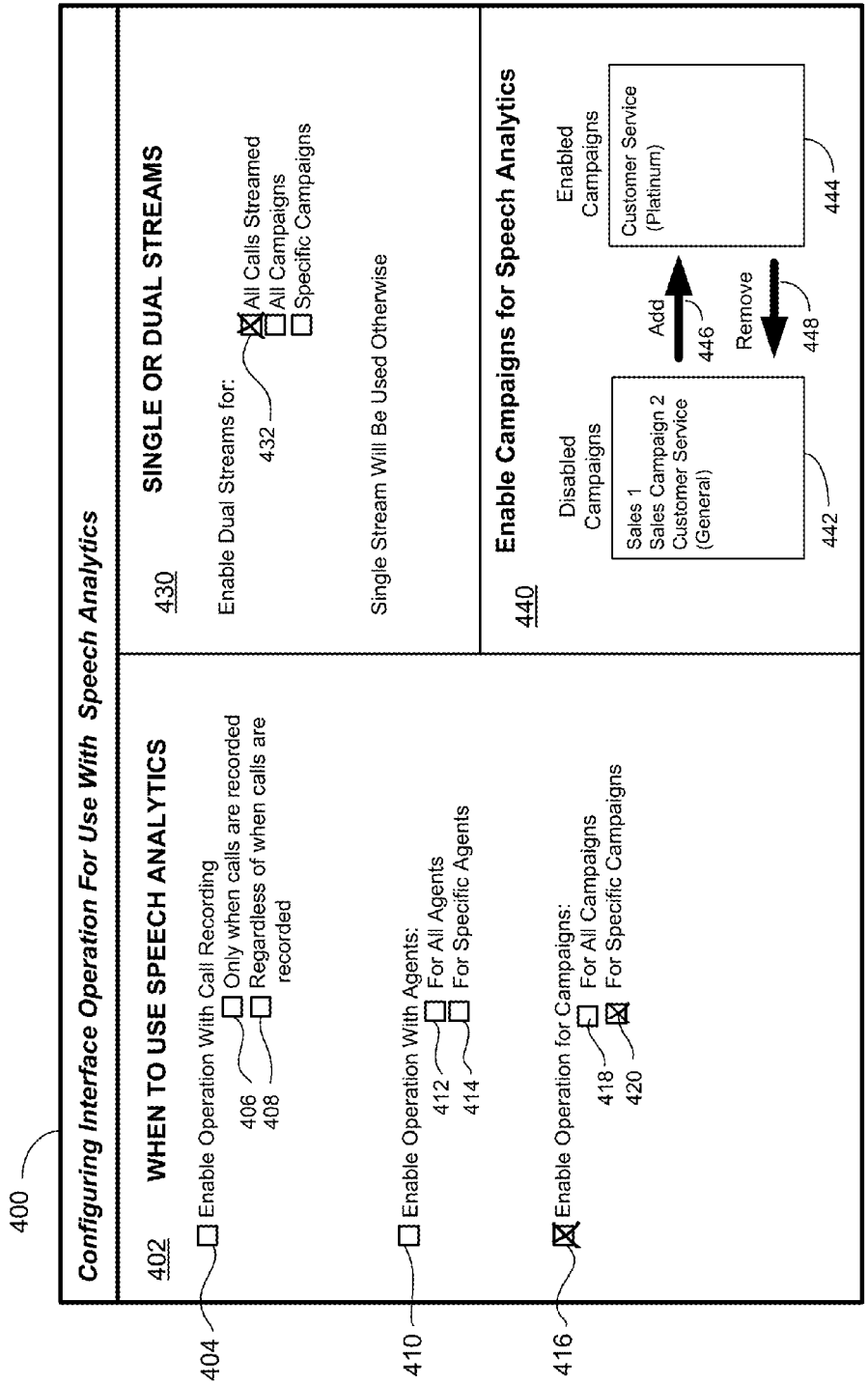
FIG. 4 illustrates one embodiment of a graphical user interface for configuring an interface for streaming audio in a contact center.

Turning to FIG. 4, an exemplary embodiment of a GUI 400 is shown for allowing an administrator to configure a call handler to interface with a speech analytics system. The window allows the administrator to specify when and how interfaces are established to the speech analytics system. The first portion 402 allows parameters to be specified as to when the interfaces are used. Several options are presented that the user can select, including enabling operation only with call recording 404, enabling operation with calls associated with agents 410, and enabling operation with calls associated with specific campaigns 416.

The first option enables streaming operation with call recording 404 and allows calls to be streamed only when they are recorded 406, or regardless of when calls are recorded 408. Not all embodiments may link call recording with streaming.

The next option enables operation of streaming with respect to agents 410. In one case, all agents can be enabled 412 so that any call involving the agent is streamed. Alternatively, specific agents can be defined 414. If this option is selected, an additional window pane portion may appear allowing selection of the agents.

The third option shown in the window pane 402 pertains to configuring streaming with respect to campaigns 416. This option allows streaming calls for all campaigns 418 or only for specific campaigns 420. If the latter is selected, as represented by an "X" in the check box, then another window pane 440 may be presented to the administrator that allows specific campaigns to be selected. One approach involves showing a list of campaigns by name in a box 442 that are currently disabled, and then using an icon 446 to add the selected campaign to another box 444 that represents enabled campaigns. Similarly, campaigns selected can be removed using a corresponding icon 448. A similar structure can be used for selecting/removing agents when operation is enable for specific agents.

Another window pane 430 allows the administrator to select how the streaming is to occur. In the embodiment shown, the option 432 for using dual streams with all calls is selected. Other options may be presented, and this embodiment allows dual streams to be used on a campaign level as well. If dual streams are not selected, then a single stream will be used. Other embodiments may allow other configuration options for defining how single/dual streams are to be used. The embodiment shown is to illustrate the application of the concepts and technologies and is not intended to limit the scope thereof.

Once the interfaces have been configured, the call handler then knows how each call should be handled with respect to establishing interfaces to the SAM. These configuration parameters indicate when and how streaming a call occurs.

Interface Configuration Impact on License Usage

The use of software licenses is well known. In many embodiments, the contact center may utilize a speech analytics vendor that requires a software license to use resources in the SAM. In various embodiments, the speech analytics vendor may provide a speech analytics system comprising software and hardware, or provide software only, which may reside in hardware provided by the contact center. In some embodiments, each stream established from the call handler to the SAM requires a license or other form of authorization with respect to the SAM. In various configurations, the contact center may purchase or otherwise control a number of licenses defining a level of use on the speech analytics module. In one embodiment, each license allows one stream to be analyzed. Thus, possessing X number of licenses allows X number of simultaneous streams to be established to the SAM.

The streaming configurations may be impacted by the number of licenses present in the call handler. Establishing dual streams for each call requires twice as many licenses compared to using a mixed audio stream for each call. The relationship between interface configurations and license usage is shown by the process flow illustrated in FIG. 5.

Figure 5:
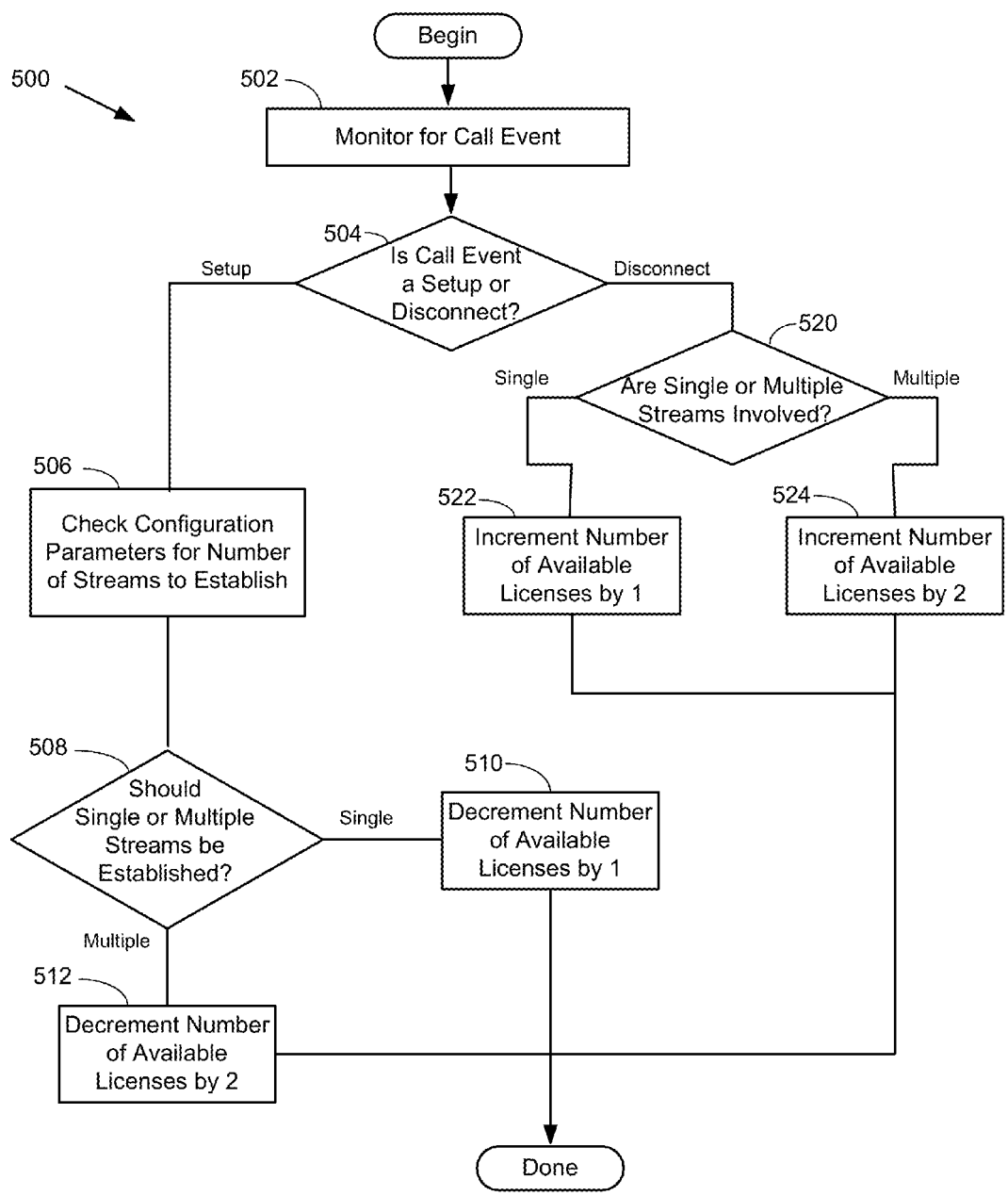
FIG. 5 illustrates one embodiment of a process flow for managing licenses in conjunction with streaming audio to a speech analytics module.

Turning to FIG. 5, the process flow 500 begins with monitoring for a call event in operation 502. A call event can be any event related to a call, such as the request for establishing a call, answering a call, terminating a call, etc. Once detected, a test in operation 504 occurs for the purpose of ascertaining whether the event relates to a call setup (establishment) or call disconnect (termination). If the event involves establishment of a call, then the configuration parameters previously established are examined in operation 506. Assuming that a stream should be established, then a determination is made whether one or two streams should be established to the SAM for the call in operation 508. If a single stream comprising mixed audio, i.e., audio of both the party and the agent, is to be established, then the number of available licenses should be decremented by one in operation 510. The process is completed. If, however, two streams should be established, i.e., one stream for agent audio and another for the remote party audio, then the number of available licenses should be decremented by two.

If the call event pertains to disconnecting a call in operation 504, then a determination is made as to how many streams are involved with the call in operation 520. If the call involves a single stream, then upon disconnecting the call the number of available licenses should be incremented by 1 in operation 522. Similarly, if the number of streams involved is two, then upon disconnecting the call the number of available licenses should be incremented by two in operation 524. The process is completed.

In some instances, calls may not be streamed at all to the SAM, and if so, then no licenses are involved. This option is not shown in FIG. 5, but it should be readily apparent that the number of available licenses is not incremented or decremented by establishing or disconnecting calls that do not involve streaming.

The diagram of FIG. 5 shows how the number of available licenses are impacted by how the interfaces are configured. The number of licenses available, in turn, may impact whether the streams can be established. It is possible that more streams may be required than there are licenses. This is shown in FIG. 6

Figure 6:
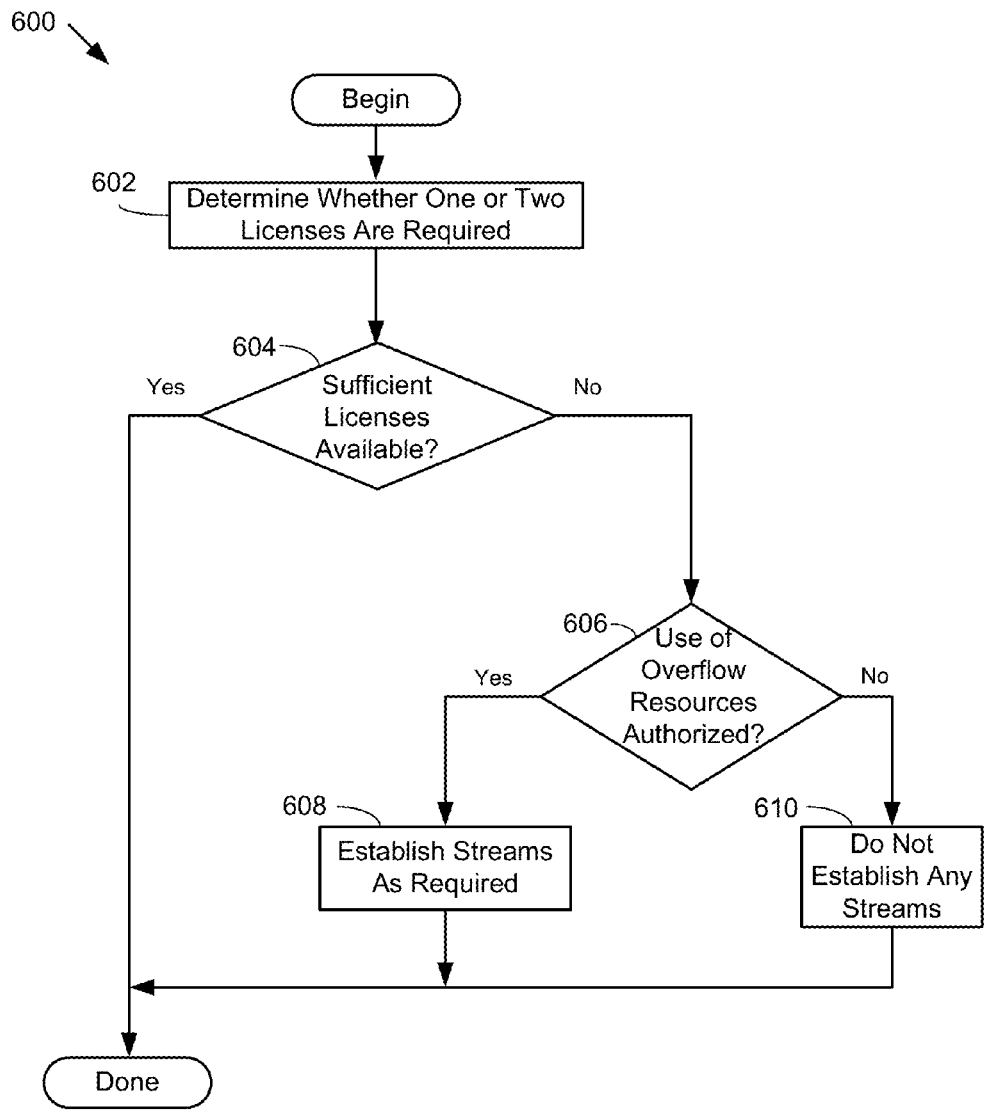
FIG. 6 illustrates one embodiment for accessing overflow speech analytic resources in a contact center.

Turning to FIG. 6, the process 600 illustrates how the availability of licenses may limit whether one or more streams may be established. The process begins with determining for a call event involving a setup, whether one or two licenses are required. This corresponds to the number of streams that are to be established. A test is made to see whether there are sufficient licenses available in operation 604. If there are sufficient licenses available, then the process is completed and there is no restriction on establishing the streams to the SAM. On the other hand, if there is limitation encountered, then a number of options are possible.

One option is to invoke usage of overflow resources, if they are available. A contact center may contract to have another speech analytics system available for use on an overflow or per call basis. If such use is available and authorized in operation 606, then the streams can be established as required in operation 608 using the overflow resources. On the other hand, if such overflow resources are not available, or not authorized, then in operation 610 the streams are not established, and the process is done.

Another embodiment, not represented by FIG. 6, involves a situation where the call requires two licenses, but only one license is available. In this case, rather than not establish any streams to the SAM, a single stream comprising mixed audio could be established to the SAM despite the interface configuration parameters indicating that separate streams should be established. However, using mixed audio in one stream may not allow the SAM to perform the necessary speech recognition functions it is expected to perform. This embodiment may not be frequently used, but it is within the scope of the concepts and technologies related configuring the interface to the SAM.

Exemplary Hardware

Exemplary Computer Processing Device

Figure 7:
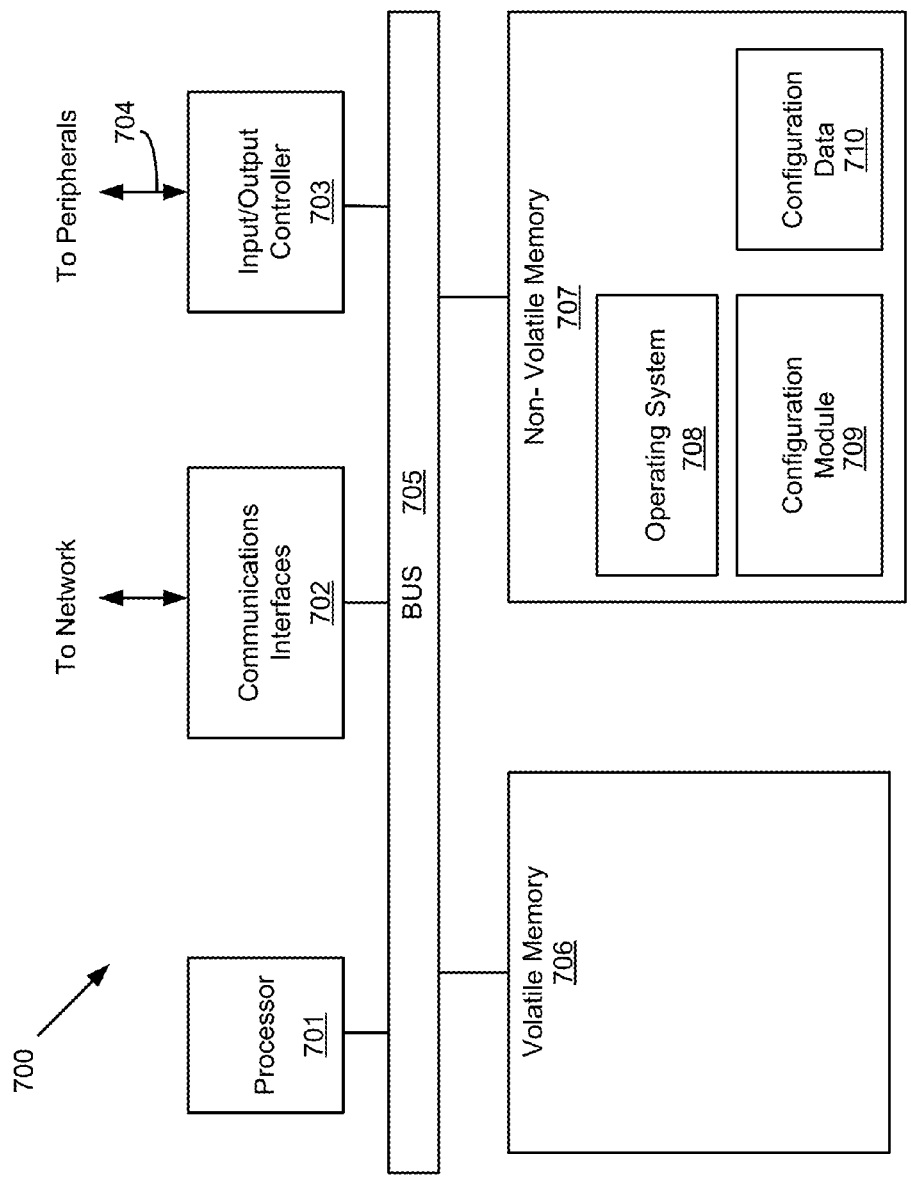
FIG. 7 illustrates one embodiment of a computing system used to provide the various technologies and concepts disclosed herein.

FIG. 7 is an exemplary schematic diagram of a computer processing system that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 701 that may communicate with other elements within the processing system 700 via a bus 705. The processor 701 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 702 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface 704 such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The processor 701 may be configured to execute instructions stored in volatile memory 706, non-volatile memory 707, or other forms of computer readable storage media accessible to the processor 701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. For example, the non-volatile memory 707 may store one or more modules, such as the configuration module 709 that may implement and perform the above-mentioned process flows containing instructions for performing the process and/or functions associated with the technologies disclosed herein, as well as operating system code 708. The configuration module 709 may also manage data such as the configuration data 710 for configuring streaming involved in various calls. The data in the non-volatile memory may be copied (not shown) in the volatile memory 706 at run time. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the processor 701 and may form a part of, or may interact with, the configuration module 709.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not include a transitory, propagating signal, or photons, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The examples for illustrating the concepts and the technologies herein have focused on agents in a contact center, but could be easily applied to other types of applications. Further, those skilled in the art will recognize that in light of this disclosure, many alternative embodiments could be designed taking into account the concepts and technologies disclosed herein.

The invention claimed is:

1. A system for providing a graphical user interface ("GUI") to a user to configure interface configuration parameters for streaming a call from a call handler in a contact center to a speech analytics system ("SAS"), comprising:
   a microprocessor configured to:
      provide campaign selection information on the GUI to the user allowing the user to select one or more campaigns in the call handler as a basis for streaming the call to the SAS, wherein the call is associated with the selected one or more campaigns;
      provide campaign de-selection information on the GUI to the user allowing the user to de-select the one or more campaigns as the basis for streaming the call to the SAS;
      provide information on the GUI to the user allowing the user to indicate for the selected one or more campaigns whether to use a single audio stream or dual audio streams for streaming the call associated with the selected one or more campaigns to the SAS;
      receive a first input from the user interacting with the GUI selecting a first campaign as the basis for streaming calls associated with the first campaign to the SAS;
      receive a second input from the user indicating that the calls associated with the first campaign are to be streamed to the SAS using the dual audio streams;
      process the call associated with the first campaign, wherein the call involves a remote party;
      establish a first Voice-over Internet Protocol ("VoIP") stream to the SAS from the call handler conveying audio of an agent on the call; and
      establish a second VoIP stream to the SAS from the call handler conveying audio of the remote party on the call.

2. The system of claim 1, wherein the microprocessor is further configured to:
   receive a third input from the user interacting with the GUI selecting a second campaign as another basis for streaming calls associated with the second campaign to the SAS; and
   receive a fourth input from the user indicating that the calls associated with the second campaign are to be streamed to the SAS using the single audio stream.

3. The system of claim 2, wherein the microprocessor is further configured to:
    process a second call associated with the second campaign, wherein the second campaign is different from the first campaign; and
    establish a third VoIP stream to the SAS from the call handler conveying audio from both an agent and a remote party on the second call.

4. The system of claim 3, wherein the microprocessor is further configured to:
    process a third call associated with a third campaign, wherein the third campaign is different from the first campaign and the second campaign, and wherein no VoIP stream is established from the call handler to the SAS for the third call.

5. A system for providing a graphical user interface ("GUI") to a user to configure interface configuration parameters for streaming a call from a call handler in a contact center to a speech analytics system ("SAS"), comprising:
    a microprocessor configured to:
        provide campaign selection information on the GUI to the user allowing the user to select one or more campaigns in the call handler as a basis for streaming the call to the SAS, wherein the call is associated with the selected one or more campaigns;
        provide campaign de-selection information on the GUI to the user allowing the user to de-select the one or more campaigns as the basis for streaming the call to the SAS;
        provide information on the GUI to the user allowing the user to indicate for the selected one or more campaigns whether to use a single audio stream or dual audio streams for streaming the call associated with the selected one or more campaigns to the SAS; and
        receive one or more inputs from the user interacting with the GUI indicating:
            a first campaign as the basis for streaming calls associated with the first campaign to the SAS, and the calls associated with the first campaign are to be streamed to the SAS using the dual audio streams.

6. The system of claim 5, wherein the microprocessor is further configured to record audio of the call based on the interface configuration parameters.

7. The system of claim 1, wherein the microprocessor is further configured to determine a number of available licenses and decrement the number of available licenses by two in response to establishing the first VoIP stream and the second VoIP stream.

8. A method for configuring interfaces on a call handler for streaming calls to a speech analytics system ("SAS"), the method comprising the steps of:
    receiving a request from a user to configure the interfaces on the call handler;
    presenting a graphical user interface ("GUI") to the user by a computer processor for allowing the user to select one or more campaigns, wherein calls associated with the one or more campaigns are to be streamed from the call handler to the SAS;
    receiving a first input at the computer processor from the user selecting the one or more campaigns in which the calls associated with the one or more campaigns are to be streamed from the call handler to the SAS;
    using the GUI to present information to the user by the computer processor allowing the user to specify whether one or two audio streams are to be established from the call handler to the SAS for each call associated with the one or more campaigns;
    receiving a second input at the computer processor from the user specifying a number of streams that are to be established from the call handler to the SAS for each call associated with the one or more campaigns;
    processing a call by the call handler, wherein the call is associated with one of the one or more campaigns selected by the user in which the calls associated with the one or more campaigns are to be streamed from the call handler to the SAS;
    using interface configuration parameters associated with the one or more campaigns to determine whether to stream one or two audio streams to the SAS; and
    establishing the one or two audio streams from the call handler to the SAS, wherein the one or two audio streams convey real-time VoIP audio data of the call.

9. The method of claim 8, further comprising the steps of:
    using the interface configuration parameters by the computer processor to determine whether to record the call; and
    causing the call to be recorded.

10. The method of claim 9, wherein recording the call comprises recording two streams associated with the call.

11. The method of claim 8 further comprising the steps of:
    processing a second call by the call handler, wherein the second call is not associated with the one or more campaigns indicated by the user in which the calls associated with the one or more campaigns are to be streamed from the call handler to the SAS;
    using second interface configuration parameters associated with a campaign associated with the second call to determine whether to stream the second call from the call handler to the SAS; and
    determining based on the second interface configuration parameters to not stream the second call from the call handler to the SAS.

12. The method of claim 8 further comprising:
    reducing an appropriate number of available voice analytics software licenses based on whether one or two audio streams are streamed to the SAS.

13. A non-transitory computer readable medium storing instructions that when executed cause a processor to:
    provide campaign selection information on a GUI to a user allowing the user to select one or more campaigns in a call handler as a basis for streaming a call from the call handler to a speech analytics system ("SAS"), wherein the call is associated with the selected one or more campaigns;
    provide campaign de-selection information on the GUI to the user allowing the user to de-select the one or more campaigns as the basis for streaming the call to the SAS;
    provide information on the GUI to the user allowing the user to indicate for the selected one or more campaigns whether to use a single audio stream or dual audio streams for streaming the call associated with the selected one or more campaigns from the call handler to the SAS;
    receive a first input from the user interacting with the GUI selecting a first campaign for streaming calls associated with the first campaign from the call handler to the SAS;
    receive a second input from the user indicating that the calls associated with the first campaign are to be streamed to the SAS using the dual audio streams;

process a call associated with the first campaign, wherein the call involves a remote party;

establish a first Voice-over Internet Protocol ("VoIP") stream from the call handler to the SAS conveying audio of an agent on the call; and establish a second VoIP stream from the call handler to the SAS conveying audio of the remote party on the call.

14. The non-transitory computer readable medium of claim 13, wherein the instructions when executed further cause the processor to:

receive a third input from the user interacting with the GUI selecting a second campaign for streaming other calls associated with the second campaign from the call handler to the SAS; and receive a fourth input from the user that the other calls associated with the second campaign are to be streamed to the SAS using the single audio stream.

15. The non-transitory computer readable medium of claim 14, wherein the instructions when executed further cause the processor to:

process a second call associated with the second campaign, wherein the second campaign is different from the first campaign and involves a different remote party; and establish a third VoIP stream to the SAS conveying mixed audio from both an agent and the different remote party on the second call.

16. A system for providing a graphical user interface ("GUI") to a user to configure interface configuration parameters for streaming a call from a call handler in a contact center to a speech analytics system ("SAS"), comprising:

a microprocessor configured to:

provide agent selection information on the GUI to the user allowing the user to select one or more agents in the call handler as a basis for streaming the call to the SAS, wherein the call is associated with the one or more agents;

provide agent de-selection information on the GUI to the user allowing the user to de-select the one or more agents as the basis for streaming the call to the SAS, provide information on the GUI to the user allowing the user to indicate for the selected one or more agents whether to use a single audio stream or dual audio streams for streaming the call associated with the selected one or more agents to the SAS, and receive one or more inputs from the user interacting with the GUI to:

select a first agent as the basis for streaming calls associated with the first agent to the SAS, and indicate that the calls associated with the first agent are to be streamed to the SAS using the dual audio streams;

and a call handler configured to:

process the call associated with the first agent, wherein the call involves a remote party, establish a first Voice-over Internet Protocol ("VoIP") stream to the SAS from the call handler conveying audio of the agent on the call, and establish a second VoIP stream to the SAS from the call handler conveying audio of the remote party on the call.

\* \* \* \* \*